UNITED STATES PATENT OFFICE.

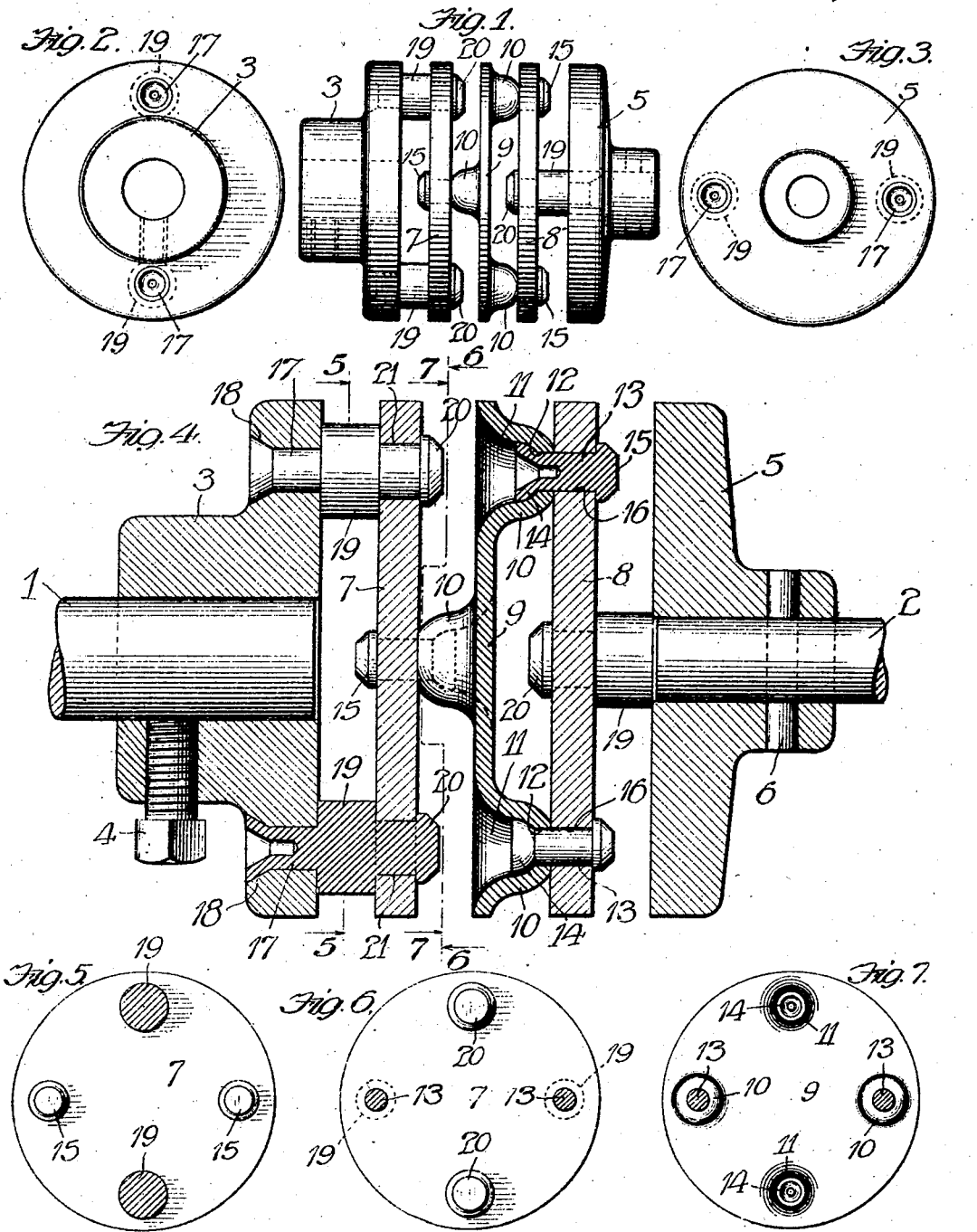

MAURICE C. TRAVIS, OF CHICAGO, ILLINOIS, ASSIGNOR TO THE ISKO COMPANY, OF CHICAGO, ILLINOIS, A CORPORATION OF ILLINOIS.

FLEXIBLE COUPLING.

1,402,688.  Specification of Letters Patent.  Patented Jan. 3, 1922.

Application filed December 29, 1919. Serial No. 348,239.

*To all whom it may concern:*

Be it known that I, MAURICE C. TRAVIS, a citizen of the United States, residing at Chicago, in the county of Cook and State of Illinois, have invented certain new and useful Improvements in Flexible Couplings, of which the following is a specification.

My invention relates to a flexible coupling between a driving and a driven shaft and the object thereof is to produce a simple and efficient coupling of this character. This coupling has been designed more particularly for use in connection with an electric motor which is adapted to drive the pump of a refrigerating machine such as used in households and which is necessary to be quiet in its operation and prevented from transmitting or setting up noises due to vibration. This particular coupling therefore performs not only the usual flexible coupling function but also prevents the transmission of vibration from the motor and in addition permits of a resilient mounting of the motor upon its base to prevent vibration of such base.

In the drawings Fig. 1 is an elevation of my coupling; Figs. 2 and 3 are elevations looking at the left and right hand ends respectively of Fig. 1; Fig. 4 a longitudinal sectional elevation of the coupling on a larger scale and Figs. 5, 6 and 7 cross-sections on the corresponding section lines of Fig. 4.

Referring to the particular embodiment of my invention as shown in the drawing, the coupling forms the connection between the adjacent ends of a driving shaft 1 and a driven shaft 2. The coupling comprises a head 3 secured to the driving shaft 1 in suitable manner as by the set screw 4, a somewhat similar head 5 secured to the driven shaft 2 in suitable manner as by the cross pin 6, and a series of parallel disks or plates connected to the heads and to each other in the peculiar manner now to be described.

There are three parallel members which I will hereinafter, for convenience, refer to as disks although not necessarily circular in form. These disks are normally in parallel relationship with each other and with the heads and are spaced apart by the same means which secure them together. Likewise the outermost disks are spaced apart from their heads by the same means that secure them thereto.

The two outer disks 7 and 8 are flexible disks, the same being made of suitable material such as fabric, leather, or the like. The center disk 9 is made of a suitable metal and is located between the two flexible disks and secured thereto at different points.

The center disk 9 is secured to each of the disks 7 and 8 at two points on opposite sides of its center, this securing means permitting of ready detachability. The center disk is provided with two bosses 10 projecting from each side, each pair of bosses being 90 degrees removed from the other pair, and the bosses of each pair being diametrically opposite each other. These bosses form sockets 11 and holes 12 pass through their ends so that rivets 13 having hollow ends 14 may be passed through the holes and have their ends expanded in the sockets as particularly shown in Fig. 4. The projecting ends of these rivets 13 have slightly enlarged heads or flanges 15 which are adapted to be passed through holes or openings 16 formed at diametrically opposite points in the disks 7 and 8. It will be understood that in assembling these parts the rivet heads may be pressed through the openings 16 and snapped into place and they may be as readily removed.

After the disks 7 and 8 have thus been secured to the center disk 9, they are somewhat similarly secured to the heads 3 and 5 respectively. Each of these heads is provided with rivets 17 having hollow expanded ends 18, enlarged middle portions 19 and flanged heads 20, and the disks 7 and 8 have holes or openings 21 arranged at 90 degrees from the openings 16 which may be snapped over the heads 20 as shown in Fig. 4. The enlarged portions 19 of these rivets 17 thus separate the flexible disks 7 and 8 from their respective heads and the bosses 10 of the middle disk perform a similar function at those points.

The coupling as a whole, by reason of the plurality of flexible disks, is very flexible, permitting changes in angularity and offsetting of the shafts as well as considerable relative endwise movement, and the disks are easily removable for replacement.

I claim:
1. A flexible shaft coupling comprising, in combination with the adjacent ends of a driving and a driven shaft, a pair of normally parallel flexible disks each secured at two points at opposite sides of its center to said shafts, said two points of one disk being in a plane at right angles to the plane of the two points of the other disk, and a connecting member located between the flexible disks and secured at points at opposite sides of its center to the flexible disks, said connecting member being in the form of a metal disk having its opposite sides at said securing points distorted to form sockets on one side and bosses on the other side, and rivets cooperating with such sockets and bosses and secured at their outer ends to the flexible disks.

2. A flexible shaft coupling comprising, in combination with the adjacent ends of a driving and a driven shaft, a pair of normally parallel flexible disks each secured at two points at opposite sides of its center to said shafts, said two points of one disk being in a plane at right angles to the plane of the two points of the other disk, a metal disk located between the flexible disks and secured at points at opposite sides of its center to the flexible disks, and means separate from the disks for supporting the two flexible disks and securing them respectively to one of the shafts and to the metal disk.

3. A flexible shaft coupling comprising, in combination with the adjacent ends of a driving and a driven shaft, a pair of normally parallel flexible disks, each secured at two points at opposite sides of its center to one of said shafts, a metal disk located between the two flexible disks and secured thereto at points at opposite sides of its center, and means for so securing said parts and spacing them from each other, comprising four rivets whose ends are secured to the metal disk and which pass through the flexible disks with heads engaging the latter disks, two rivets whose opposite ends engage a shaft and the adjacent flexible disk and having an enlarged portion to act as a distance member between such shaft and flexible disk, and rivets similar to the last two mentioned rivets and engaging the other one of the two flexible disks and the other shaft.

4. A flexible shaft coupling comprising, in combination with the adjacent ends of a driving and a driven shaft, a pair of normally parallel flexible disks each secured at two points at opposite sides of its center to one of said shafts, a metal disk located between the two flexible disks and secured thereto at points at opposite sides of its center and means for so securing said parts and spacing them from each other, comprising similar pairs of rivets each pair engaging and spacing apart one of the flexible disks and its shaft, said metal disk having pairs of bosses projecting from its opposite sides and located on opposite sides of its center, and rivets connecting between such bosses and the flexible disks.

5. A flexible shaft coupling comprising, in combination with the adjacent ends of a driving and a driven shaft, a pair of normally parallel flexible disks each secured at two points at opposite sides of its center to one of said shafts, a metal disk located between the two flexible disks and secured thereto at points at opposite sides of its center and means for so securing said parts and spacing them from each other, comprising similar pairs of rivets each pair engaging and spacing apart one of the flexible disks and its shaft, said metal disk having pairs of bosses projecting from its opposite sides and located on opposite sides of its center, and rivets connecting between such bosses and the flexible disks, each of said last named rivets passing through its boss and flexible disk with one end expanded to engage the socket within the boss and with its other end enlarged to engage such flexible disk.

6. A flexible shaft coupling comprising, in combination with the adjacent ends of a driving and a driven shaft, a pair of normally parallel disks of elastic material connected at two points at opposite sides of its center to one of said shafts, said disks having holes on a diametrical line at right angles to the diameter on which said two points are located, and a connecting member located between the two flexible disks and rivets having enlarged heads adapted to be forced through said holes for detachably securing said member and disks together.

7. In a flexible joint, the combination with a joint member having a spacing boss formed thereon, said boss forming a socket in the member and having a hole at the end of the socket, of a rivet passing through said hole with its end expanded in said recess to retain the rivet, and a flexible joint member connected to said rivet.

8. In a flexible joint, the combination with a joint member having a spacing boss formed thereon, said boss forming a socket in the member and having a hole at the end of the socket, of a rivet passing through said hole with its end expanded in said socket to retain the rivet, and a flexible joint member having an opening through which said rivet passes.

MAURICE C. TRAVIS.